Patented Feb. 24, 1931

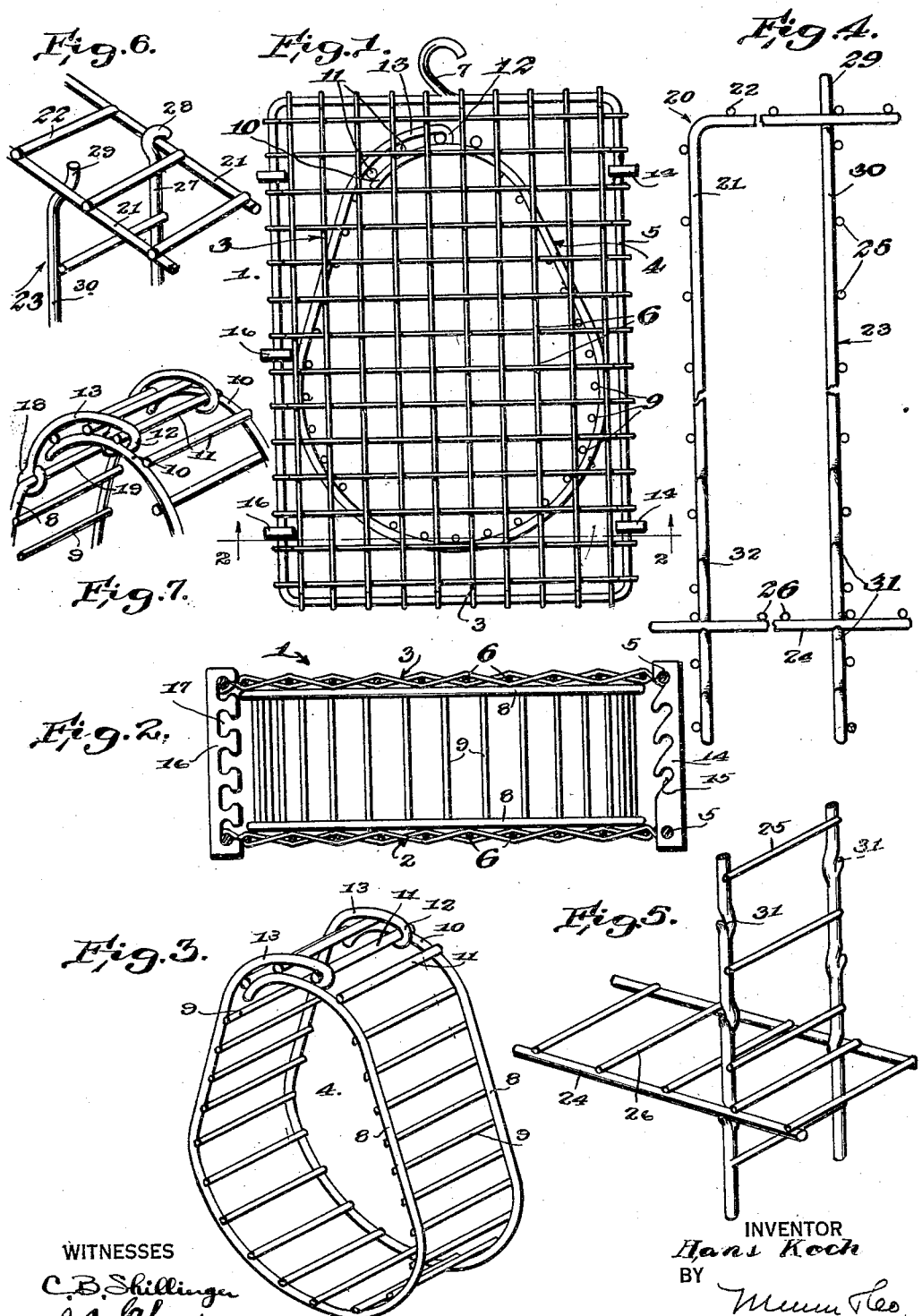

1,794,304

UNITED STATES PATENT OFFICE

HANS KOCH, OF BOISE, IDAHO

MEAT HOLDER AND MOLD

Application filed June 7, 1929. Serial No. 369,176.

This invention relates to improvements in molds and it consists of the constructions, combinations and arrangements herein described and claimed.

An object of the invention is to provide a holder which is made to assume the function of a mold for the purpose of shaping meats so that they will possess a more attractive appearance and hence become more readily saleable.

Another object of the invention is to provide a holder by which boned meats can be pressed into any one of a number of determined shapes preparatory to either cooking, roasting or barbecuing the meats so that artistry will be combined with utility to the ultimate benefit of both the seller and buyer.

A still further object of the invention is to provide a simple arrangement of wire racks which are assembled around the meat prior to the cooking process, not only to mold the piece of meat in a given shape but to impress upon the surfaces a peculiar grid-like formation which gives the meat a novel appearance.

Other objects and advantages will appear in the following specification, reference being had to the accompanying drawings, in which:

Figure 1 is a plan view of the holder particularly adapted to molding hams,

Figure 2 is a cross section taken on the line 2—2 of Figure 1,

Figure 3 is a perspective view of what is herein known as the edge rack,

Figure 4 is a fragmentary plan view of the edge rack of a holder adapted to shaping bacon, Figure 5 is a perspective view of one of the lower corners of this rack particularly illustrating the adjustment of the follower, Figure 6 is a detail perspective view of one of the upper corners of the rack illustrating how the loose side is applied, Figure 7 is a detail perspective view of the type edge rack in Figure 3, illustrating a hinged form of the clamp.

The problem of merchandising meats has led to the development of means for not only making certain meats more acceptable but so enhancing the appearance that sales can be consummated more readily. With the first end in view, it is proposed to remove the bones from meat such as ham, which is herein used as an illustration. This will enable the butcher to cut off desired measures of meat in clean, even slices.

With the second purpose in view, it is intended to press the meat into any one of a number of attractive shapes. For example, a ham may be pressed into an oval or heart shape or into the general contour of a ham, as suggested by the form of the edge rack in Figures 1 and 3.

As is previously brought out, the holder is composed of wires which in some instances are crossed. These crossed wires impress the sides of the meat with creases which give the piece of meat a particularly novel and attractive appearance. This formation of the meat is easily accomplished after the bone has been removed, but it is also possible to shape the meat after only some of the bones have been removed. The shaping will be done before the meat is subjected to either boiling, roasting or barbecuing, and of course after the cooking process is completed the particular shape will remain a permanent quality until it is cut up for sale.

Reference is now made to the drawings. Two types of the device are disclosed. The type in Figures 1 to 3 is especially adapted for shaping hams, while the type in Fig. 4 is intended for shaping sides of bacon. Considering the first type, the holder generally designated 1 comprises bottom and top racks 2 and 3 (Fig. 2), between which an edge rack 4 is situated. This rack is made in the general shape of a ham only its contour is more symmetrical than that of the original product.

Each top and bottom rack comprises a rectangular frame 5 of one-quarter ($\frac{1}{4}$) inch wire across which is applied a mesh 6 of #11 gauge wire. The wire mesh may be applied to the frame 5 in each instance either by curling the ends around but more preferably by electro-welding. One of the racks, the top rack 3 for example, is equipped with a hook 7 by which the holder can be hung up in the smokehouse.

The edge rack comprises a pair of frames 8 (Fig. 3) composed of #8 gauge wire which are spaced apart by a series of #14 gauge wires 9 which stop short of the free ends of the frames. One pair of the free ends 10 is equipped with a plurality of grip wires 11 to any one of which the hooks 12 on the other pair of free ends 13 may be applied to hold the edge rack 4 in a particular adjustment. As the rack 4 is applied to the edges of the meat it will be brought around until the hooks 12 can be fitted over the nearest one of the grip wires 11. The rack is thus locked in position.

It is to be observed that the series of wires 9 is located on the inside of the rack 4. They are thus in position to take the strain to better advantage. The meat will be under compression and will exhibit some tendency towards spreading. By virtue of the wires 9 being applied to the insides of the frames 8 the latter will take the thrust, and there will be no likelihood whatever of the wires 9 being forced apart. In the instance of the grip wires 11 these might also be located on the inside of the rack, but inasmuch as they are situated at the small end of the rack the spreading tendency of the meat will not be so apparent and consequently these wires are located on the outside where they are more readily accessible.

Hinge bars 14 are permanently hinged upon the frame 5 of one of the racks, for example the bottom rack 2. A plurality of notches 15 provides for connection with the other rack, the reason for the plurality of notches being to accommodate various thicknesses of hams, it being the intention to supply the edge rack 4 in various depths. In other words, the edge rack in Fig. 2 is of the greatest depth, hence the frame of the top rack 3 is fastened in the notch 15 farthest from its hinge connection with the bottom rack 2.

A more shallow edge rack would require a fastening of the top rack in others of the notches 15. Agreeable with this provision each of a plurality of clamp bars 16 is provided with notches 17 which are intended to receive the frames of the bottom and top racks much on the order of the notches 15 of the hinge bars 14. While the notches 17 are different in configuration from the notches 15 yet they possess the essential under-cut features which serve to retain the frames in the notches after the clamps have been applied.

The clamp bars 16 are perfectly loose, that is to say they are distinguished from the hinge bars 14 by not being permanently connected with one of the frames. Usually two of the hinge bars will be sufficient but the clamp bars are supplied in a larger number. These bars will be applied wherever it is desired to squeeze the racks together. For instance, Fig. 1 shows three of the clamp bars applied to the side of the holder opposite to the hinge bars. Should it be found necessary to squeeze the narrow ends of the holder together one or more of the clamp bars may be applied at these points. On the same principle one may apply an extra clamp bar to the hinge side at a point between the bars 14.

As a variation from the arrangement in Figure 3 the connecting arrangement of the edge rack 4 may be made on the order of Fig. 7. Instead of the pair of free ends 13 being integral with the frames 8 they are curled over in hinge formation at 18 upon a bridge 19. The hinge ends will swing upon the bridge 19, but will be engaged with one of the grip wires 11 precisely in the manner already described and especially as shown in Figure 7.

In addition to shaping hams it is also proposed to shape sides of bacon, but inasmuch as these offer but little latitude far artistic treatment, the shaping must be confined to strictly rectangular forms. In considering Fig. 4 it must be borne in mind that bottom and top racks precisely on the order of the racks 2 and 3 will be employed. These racks are not shown in the bacon holder and form because they are no different in structure from those in Figs. 1 and 2 with the exception of a greater elongation in shape.

The bacon holder comprises what may be identified as a fixed abutment 20. This comprises a pair of wires like the wire 21, bent into right-angular form and secured in spaced relationship by a series of wires 22. These wires stand perpendicularly to the page in Fig. 4 and the reader can readily imagine a wire corresponding to 21 in the nethermost plane to which the lower ends of the wires are connected. In fact Fig. 6 shows the two ends of the wires 21 and also several of the series of wires 22. A loose side 23 and a follower 24 complete the rectangular form of the bacon holder.

Wires 25 and 26 hold the wire members of the loose side and follower in spaced relationship, it being borne in mind that here as in all other instances, the series of wires are welded or otherwise permanently connected with the members which they are intended to space apart. One of the wires 27 of the side 23 has a partially curled end 28 (Fig. 6) to compose a hinge.

The corresponding end of the other wire 30 is bent or offset to produce a prong 29 (Fig. 6). In applying the loose side 23 the curled end 28 will be rested upon one of the wires 21 and the side 23 will be rotated until the prong 29 is brought into locking engagement with the companion wire 21. The prong is long enough to keep the side 23 in its connected position.

At the opposite ends the wires 27 and 30 are provided with serrations 31 (Fig. 5).

These match corresponding serrations 32 on the long ends of the wires 21. The follower 24 is large enough to slip over the lower ends of the fixed abutment 20 and loose side 23 in the manner suggested in Figs. 4 and 5, and as it is pressed up against the end of the bacon it will be caught in the most appropriate pairs of the serrations and thus be held at a given adjustment.

The operation is readily understood. In considering the foregoing description of the bacon holder in Fig. 4 it must be considered that bottom and top racks corresponding to 2 and 3 in Figs. 1 and 2 will be used in connection with the abutment 20, the loose side 23 and follower 24. These last parts are shown broken away in Fig. 4 to indicate that the holder is larger than the view might indicate.

Assume that it is desired to mold a side of bacon into true rectangular shape. A holder corresponding to 1 in Fig. 1 and consisting of racks 2 and 3 connected by hinge bars 14 will be used. The bacon will be laid upon the bottom rack and the edge rack which the structure in Fig. 4 comprises is assembled around the edges of the bacon. The loose side 23 and follower 24 will be brought up as closely as possible to crowd the bacon into the corner defined by the fixed abutment 20.

After these adjustments are completed the top rack will be closed down and locked by means of the clamp bars 16. Substantially the same mode of procedure will be followed in shaping a ham. In this instance the edge rack 4 will be assembled around the edges of the ham and connected at the loose ends as suggested in Figs. 3 and 7. The assembling of the edge rack is done after the ham has been laid upon the bottom rack 2, and after the assembling has been completed the top rack 3 will be brought down and clamped in the manner already explained.

It is now optional whether the product shall be boiled, roasted or barbecued. The hook 7 in the form in Fig. 1 is provided to permit suspending the holder 1 and its contents in a smokehouse. The holder might be suspended before an open fire as in barbecuing the ham. While this description is devoted to holders for hams and bacon it is entirely within the province of the invention to utilize the holders for sausages and other ground meats. In such instances the sausage meat would be contained by an appropriate casing and given the intended shape by compression in a suitably designed holder. Also there is hardly any limit as to the general shape to be given the product, and as an extension of the idea, one of the racks 3 may be embellished with the name or the trademark of the manufacturer so that this will appear on the surface of the meat when taken out.

While the construction and arrangement of the improved meat holder and mold is that of a generally preferred form, obviously modifications and changes may be made without departing from the spirit of the invention or scope of the claims.

I claim:

1. A holder comprising an edge rack to confine the edge of a comestible to be molded, a pair of flat racks applicable to the sides of the comestible, a pair of hinge bars to hingedly connect the flat racks along corresponding edges, and a plurality of clamp bars applicable in numbers to any selected places around the perimeter of the flat racks to squeeze the racks together and press in on the sides of the comestible.

2. A holder comprising an edge rack for confining the edge of a comestible to be molded, a pair of separate flat racks to face the sides of the comestible, and a plurality of notched clamp bars to be located in numbers around the perimeter of said racks, into the notches of which the edges of the racks are worked to apply the pressure of the flat racks to the sides of the comestible.

3. A holder comprising a pair of separate flat racks, a pair of hinge bars permanently hinged to the rim of one of the racks, said bars having notches into any one of which the corresponding rim of the other rack is temporarily set, and a plurality of clamp bars notched from end to end applicable to the remaining rims of the racks and respecting the notches of which said remaining rims are adjustable.

4. A holder comprising an open-ended edge rack consisting of a pair of frames having hook terminals at one end, a series of wires connecting the frames and situated on the inside of the rack, and a grip wire connecting the frames near the open end being located outside of the rack to be accessible by the hooks when the open ends of the rack are lapped over.

HANS KOCH.